(12) United States Patent
DSouza

(10) Patent No.: US 7,092,036 B2
(45) Date of Patent: Aug. 15, 2006

(54) EQUALIZER SYSTEM INCLUDING A COMB FILTER IN AN HDTV SYSTEM

(75) Inventor: Adolf DSouza, Westfield, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 573 days.

(21) Appl. No.: 10/388,679

(22) Filed: Mar. 14, 2003

(65) Prior Publication Data

US 2003/0193617 A1    Oct. 16, 2003

Related U.S. Application Data

(60) Provisional application No. 60/372,914, filed on Apr. 16, 2002.

(51) Int. Cl.
*H04N 5/21* (2006.01)

(52) U.S. Cl. .................. 348/614; 348/21; 375/350

(58) Field of Classification Search .............. 348/21, 348/470, 614; 375/232, 346, 348–350; 455/296, 455/302, 303, 306
See application file for complete search history.

(56) References Cited

U.S. PATENT DOCUMENTS

| | | | | | |
|---|---|---|---|---|---|
| 5,331,416 | A | * | 7/1994 | Patel et al. ................ | 348/614 |
| 5,512,957 | A | * | 4/1996 | Hulyalkar ................... | 348/607 |
| 5,602,602 | A | * | 2/1997 | Hulyalkar ................... | 348/607 |
| 5,777,692 | A | * | 7/1998 | Ghosh ........................ | 348/725 |
| 6,226,049 | B1 | * | 5/2001 | Oh ............................. | 348/607 |
| 6,384,858 | B1 | * | 5/2002 | Limberg ..................... | 348/21 |
| 6,826,242 | B1 | * | 11/2004 | Ojard et al. ................ | 375/350 |

* cited by examiner

Primary Examiner—Victor R. Kostak
(74) Attorney, Agent, or Firm—Joseph J. Laks; Ronald H. Kurdyla; Joseph J. Opalach

(57) ABSTRACT

An equalizer (34) and a prefilter (1) used in conjunction with a comb filter (2) in a High Definition Television (HDTV) system. The prefilter (1) may be placed before the comb filter (2), or alternatively may be placed after the comb filter. Further, the method may be enhanced by estimating the filter tap when the prefilter (1) is placed after the comb filter (2). The equalizer (34) produces a fifteen level output from the eight level Vestigial Sideband (VSB) input without limiting the amplitude at symbol 12 to a relatively small value, such as −20 dB. Three specific methods of increasing the permissible amplitude at symbol 12 are presented which permit tap 12 amplitudes as high as −6 dB.

6 Claims, 9 Drawing Sheets

EQUALIZER SYSTEM INCLUDING A COMB FILTER IN AN HDTV SYSTEM

The present patent application claims priority from provisional patent application No. 60/372,914 filed on Apr. 16, 2002.

BACKGROUND OF THE INVENTION

1. Field of the Invention

This invention relates generally to the field of digital signal processing and more particularly to an equalizing and filtering system suitable for processing eight symbol vestigial sideband (VSB) High Definition Television (HDTV) signals.

2. Background of the Invention

The Advanced Television Systems Committee (ATSC) standard for HDTV in the United States specifies an eight bit (eight levels per symbol) vestigial sideband (VSB) transmission system. A block diagram of a typical ATSC compatible HDTV receiver 21 is depicted in FIG. 1. The specifications for such an HDTV receiver can be found in the publication *Digital Television Standards for HDTV Transmission* of Apr. 12, 1995 prepared by the ATSC. The received VSB signal is represented by a one dimensional data symbol constellation in which only one axis contains quantized data to be recovered by the receiver. A DC compensation unit 26 uses an adaptive tracking circuit to remove from the demodulated VSB signal a DC offset component to the pilot signal component. Field sync detector 28 recovers the data field sync component by comparing every received data segment with an ideal field reference signal stored in memory in the receiver. In addition to field synchronization, the field sync signal provides a training signal for the channel equalizer 34.

In the ATSC VSB receiving system, NTSC interference detection and rejection are performed by unit 16. When strong co-channel NTSC interference is detected by unit 16, a comb filter is activated to process the signal prior to reaching the adaptive channel equalizer 34. The adaptive equalizer 34 equalizes both channel amplitude and phase distortion. As depicted in FIG. 2, the equalizer structure that is most commonly utilized includes a Feed Forward Equalizer (FFE) that is used in conjunction with a Decision Feedback Equalizer (DFE). The FFE section is used to equalize preghost signals and channel zeroes that reside outside of the unit circle of the data symbol constellation. The DFE section depicted in FIG. 3 is used to equalize post ghost signals.

A method that is commonly used to train the equalizer 34 is to apply the Blind Equalization technique until the equalizer has reached some predetermined degree of convergence, at which time the training method is switched to the Decision Directed Equalization technique. The most common form of Blind Equalization is the well known Constant Modulus Algorithm (CMA). Using the CMA, the FFE and DFE coefficients are updated using the following equations:

$$C_{n+1} = C_n + \alpha_F * e(n) * X_{Fn} \quad \text{(FFE update)}$$
$$D_{n+1} = D_n + \alpha_D * e(n) * X_{Dn} \quad \text{(DFE update)}$$

where:
$C_n$=FFE coefficient vector
$D_n$=DFE coefficient vector
$X_{Fn}$=Data vector into the FFE
$X_{Dn}$=Data vector into the DFE
$e(n)$=Blind equalization error.

The blind equalization error is calculated according to the equation:

$$e(n) = y_0(n) * (|y_0(n)|^2 - R^2)$$

where:
$y_0(n)$=Equalizer output (FFE+DFE output)
$R^2$=Ring value squared
$= E(s^4(n))/E(s^2(n))$
$s(n)$=eight VSB constellation points.

The comb filter 2 has a transfer function of $H_c(z) = 1 - z^{-12}$. The comb filter attenuates the picture and sound carriers of the adjacent NTSC channel. The new signal that the equalizer 34 must then process is the original channel convolved with the comb filter. When the comb filter is inserted prior to the equalizer 34 and the DFE taps are adapted using the CMA, the equalizer 34 produces an eight level output. In effect, the equalizer 34 equalizes both the channel and the comb filter signals. However, the goal is cause the equalizer 34 to produce a fifteen level output by equalizing only the channel signal and not equalizing the comb filter signal.

U.S. patent application Ser. No. 10/103,055, filed on Apr. 16, 2002, describes a method in which the equalizer 34 produces a fifteen symbol output when a comb filter is inserted to reject the NTSC interference. The described method solves the problem of obtaining a fifteen level output by zeroing tap twelve, dfe(12) of the Decision Feedback Equalizer 34. The limitation of this method is that the channel amplitude at symbol twelve, $c_{12}$, must be small, typically on the order of less than –20 dB.

BRIEF SUMMARY OF THE INVENTION

The present invention addresses the problem associated with prior methods of producing a fifteen level output from an equalizer preceded by a comb filter in an HDTV system. The present invention utilizes a prediction filter to permit amplitudes as high as –6 dB at tap twelve of the Decision Feedback Equalizer (DFE). One embodiment of the present invention modifies the channel impulse response at tap twelve (symbol twelve) of the DFE by placing a predictor prefilter before the comb filter. This arrangement causes the comb filter to perceive the combined channel and prefilter as the modified channel. The comb filter attenuates the NTSC interference and the equalizer therefore senses the remaining signal as being free of any NTSC components. This embodiment tends to achieve the goal of making the amplitude of the symbol twelve signal of the modified channel as small as possible, preferably approaching zero, by appropriate selection of the prefilter coefficients. In a second embodiment, the predictor filter is placed after the comb filter. A third embodiment of the present invention places the predictor filter after the comb filter with an estimate of the equalizer tap amplitude value.

DETAILED DESCRIPTION OF THE INVENTION

Figure 1:
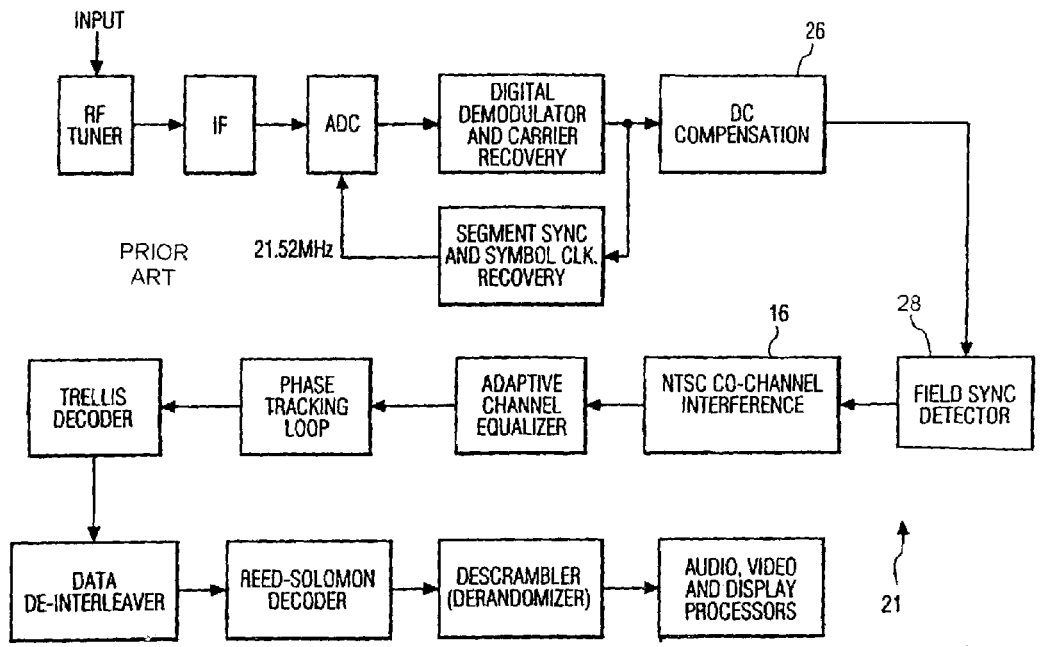
FIG. 1 is a simplified block diagram of a prior art HDTV receiving system.
Figure 2:
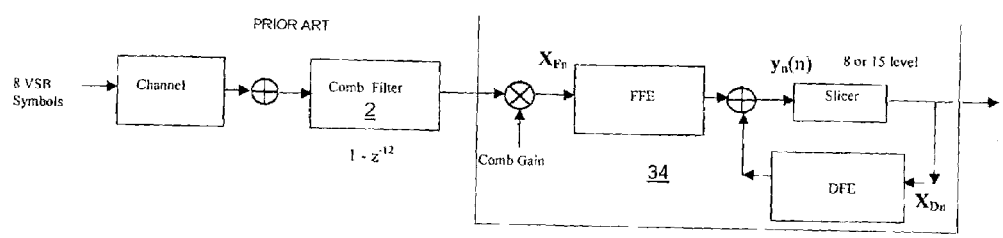
FIG. 2 is a simplified block diagram showing details of the NTSC co-channel interference filter and adaptive channel equalizer depicted in FIG. 1.
Figure 3:
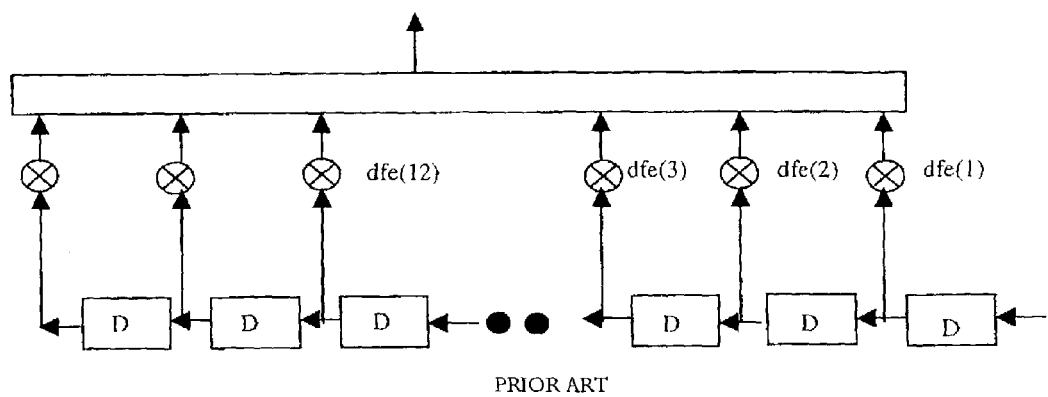
FIG. 3 is a simplified block diagram of the Decision Feedback Equalizer depicted in FIG. 2.
Figure 4:
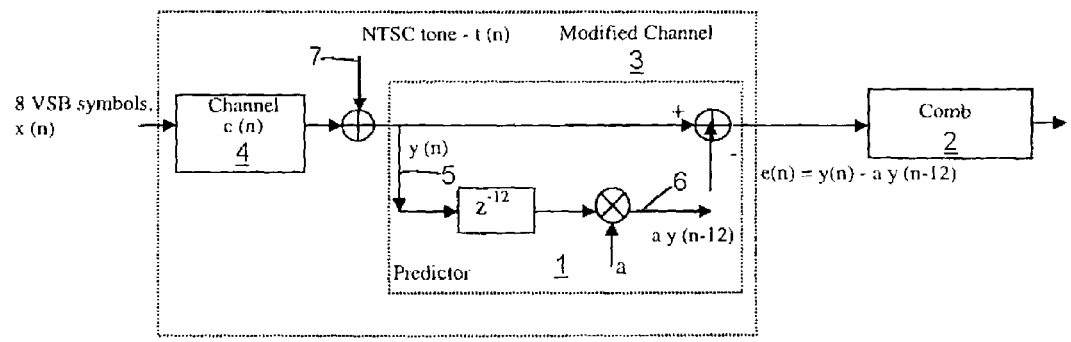
FIG. 4 is a simplified block diagram of a first embodiment of an equalizing and filtering system constructed according to the principles of the present invention.

Referring to FIG. 4, a simplified block diagram of the present invention shows a first embodiment of the present invention. One effect of setting the amplitude of symbol twelve at zero, that is, dfe(12)=0.0, during the blind equalization process is that the channel impulse response must have a small value at symbol twelve. Since the value at symbol twelve is not in fact always small, the channel impulse response at symbol twelve is modified by placing a prediction prefilter 1 before the comb filter 2. This arrangement causes the comb filter 2 to perceive the modified channel 3 as a composite of the value of channel 4 and the value of the prefilter 1. By appropriate selection of the coefficients of the prefilter 1, symbol twelve of the modified channel 3 can be made to approach a value of zero.

If the channel 4 has a transfer function of Hc(z) and the prefilter 1 has a transfer function of $H_p(z)=(1-az^{-12})$, then the modified channel 3 will have a transfer function of $H_{cm}(z)=H_c(z)(1-az^{-12})$. For the case where $H_c(z)=(1+c_{12}z^{-12}+\ldots)$, the modified channel 3 transfer function $H_{cm}(z)$ becomes:

$$H_{cm}(z) = (1+c_{12}z^{-12}+\ldots)-az^{-12}(1+c_{12}z^{-12}+\ldots) = \ldots + (c_{12}-a)z^{-12}+\ldots$$

The modified channel 3 now has a residual value of $(c_{12}-a)$ at symbol twelve. The value of "a" is selected to make this residual value as small as possible.

An estimate of the signal 5, which has a value of y(n), is made by examining the value ay(n−12) of signal 6 and subtracting that value from y(n). The estimated error, e(n) is then defined as:

$$e(n)=y(n)-ay(n-12),$$

where a=the prediction coefficient of the prediction filter 1.

The prediction coefficient "a" is selected to minimize the Mean Square Error (MSE) of e(n), where $$MSE = E[e^2(n)]$$
$$= E[y(n)-ay(n-12)]^2$$
$$= E[y^2(n)+a^2y^2(n-12)-2ay(n)y(n-12)]$$
$$= \phi_{yy}(0)+a^2\phi_{yy}(0)-2a\phi_{yy}(12)$$
$$= [1-a^2]\phi_{yy}(0)-2a\phi_{yy}(12)$$

The MSE is seen to be a quadratic function of "a". The minimum MSE (MMSE) is obtained by setting the derivative of the MSE to zero and solving for "a", thereby producing the optimum predictor coefficient. The resulting value is given as $$a=\Phi_{yy}(12)/\Phi_{yy}(0).$$

Since the MSE is a quadratic function of "a", the value of "a" that produces the MMSE may be obtained in an iterative fashion using a gradient algorithm. In a preferred embodiment, the Least Mean Squares (LMS) algorithm is used to obtain the predictor coefficient.

The channel output value 5, including the NTSC component, is given by:

$$y(n)=x(n)*c(n)+t(n)$$

where
x(n)=8 VSB symbols
c(n)=channel
t(n)=NTSC tone.

The autocorrelation function $\Phi_{yy}(m)$ of y(n), is given by:

$$\phi_{yy}(m) = E[y(n)y(n-m)]$$
$$= E\left[\left(\sum_k c(k)x(n-k)\right)+t(n)\right]\left[\left(\sum_j c(j)x(n-j-m)\right)+t(n-m)\right]$$
$$= E\left[\sum_k \sum_j c(k)c(j)x(n-k)x(n-j-m)\right]+$$
$$E\left[t(n)\sum_j c(j)x(n-j-m)\right]+E\left[t(n-m)\sum_k c(k)x(n-k)\right]+$$
$$E[t(n)t(n-m)]$$
$$= \sigma_x^2 \phi_{cc}(m)+0+0+E[t(n)t(n-m)],$$

assuming that the 8 level VSB signal, x(n), is white and that the NTSC tone and the 8 level VSB symbols are uncorrelated, where $\Phi_{cc}(m)$ is the autocorrelation function of the channel. If $t(n)=A\cos(w_0 n)$, then $$E[t(n)t(n-m)] = E[A^2\cos(w_0 n)\cos(w_0)(n-m)]$$
$$= E[A^2/2\{\cos(w_0 m)+\cos(2w_0 n-w_0 m)\}]$$
$$= (A^2/2)\cos(w_0 m),$$

where A=NTSC tone 7 amplitude.

The autocorrelation function then becomes:

$$\Phi_{yy}(m) = \sigma_x^2 \Phi_{cc}(m) + (A^2/2)\cos(w_0 m).$$

For VSB values at the symbol rate of 10.76 MegaHertz (MHz), an NTSC tone frequency of 0.8967 MHz and a value of m=12, the autocorrelation function is:

$$\Phi_{yy}(12) = \sigma_x^2 \Phi_{cc}(12) + 0.5A^2.$$

By defining $\beta$ as $0.5A^2$, for NTSC tone amplitudes of A=0.10 and 0.15 the value of $\beta$ is $5 \times 10^{-3}$ and $11.25 \times 10^{-3}$, respectively. Each of these values is relatively small, and result in a ratio of NTSC to VSB power of approximately −13 dB and −10 dB, respectively.

Based on the foregoing, the optimum predictor coefficient can be stated as:

$$a = \phi_{yy}(12)/\phi_{yy}(0)$$
$$= [\sigma_x^2 \phi_{cc}(12) + \beta]/[\sigma_x^2 \phi_{cc}(0) + \beta]$$
$$= [\phi_{cc}(12)/\phi_{cc}(0)]F$$

where $F = [1 + \{\beta/\sigma_x^2 \Phi_{cc}(12)\}]/[1 + \{\beta/\sigma_x^2 \Phi_{cc}(0)\}]$.

If no NTSC component is present, then $\beta=0$ and $F=1$, and the optimum predictor coefficient becomes $\Phi_{cc}(12)/\Phi_{cc}(0)$. F is the factor by which the optimum predictor coefficient without an NTSC component is modified due to the presence of the NTSC component 7.

In order to more fully explain the foregoing, the simulation results for several specific cases will now be presented and examined. Table 1 depicts the assumed ghost signal profiles that pertain to the following discussion.

TABLE 1

| Channel | Delay (symbols) | Amplitude (absolute) |
|---|---|---|
| A | 0 | 1.0 |
| B | 0 | 1.0 |
|   | 5 | 0.5 |
| C | 0 | 1.0 |
|   | 5 | 0.5 |
|   | 20 | 0.3 |
| D | 0 | 1.0 |
|   | 5 | 0.5 |
|   | 15 | 0.3 |
|   | 20 | 0.3 |
| E | 0 | 1.0 |
|   | 5 | 0.5 |
|   | 15 | 0.3 |
|   | 20 | 0.3 |
|   | 24 | 0.3 |

Table 2 depicts the assumed signal characteristics of channel D.

TABLE 2

| Constellation Points | −224, −160, −96, −32, 32, 96, 160, 224. (All divided by 512) |
|---|---|
| Ring Size (fifteen level ring) | 0.3125 |
| Blind Equalization (CMA) - Number of symbols | One Million |
| Decision Directed Equalization (DDE) - Number of symbols | One Million |
| Initial Value of FFE Main Tap | 1.0 |
| Comb Gain | 0.5 |

TABLE 2-continued

Figure 5:
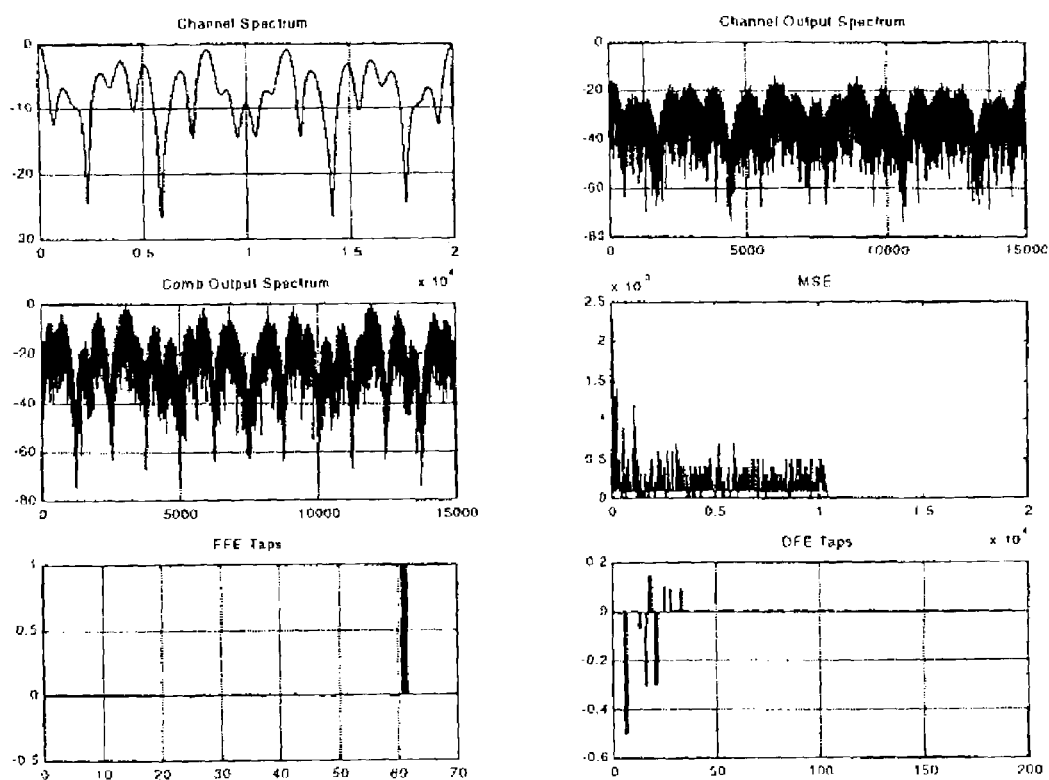
FIG. 5 is a series of convergence curves showing the characteristics of a channel processed by the first embodiment of the present invention.

| FFE step size | 0.001 |
|---|---|
| DFE step size | 0.008 |
| Prediction Filter before Comb - Step Size | $0.2 \times 10^{-3}$ |
| Channel | D |
| NTSC Tone Amplitude | Depicted in FIG. 5 |

The first example is for the case where the NTSC signal 7 is equal to zero, in which case the comb filter 2 is not needed. The only contribution to $\Phi_{cc}(12)$ is from the main channel 4 and from a ghost signal at symbol twelve. In other words, there is no other pair of ghosts that are spaced exactly twelve symbols apart. For this situation, the predictor coefficient is:

$$a = \phi_{cc}(12)/\phi_{cc}(0)$$
$$= c_{12}/\phi_{cc}(0), \text{ the main tap of the channel 4 being equal to 1.}$$

Since $\Phi_{cc}(0) = 1 + c_{12}^2 + $(squared terms attributable to other ghost signals), then $$\Phi_{cc}(0) > 1.$$

Therefore, $|a| = |c_{12}|$, except in the trivial case where the channel is an impulse. In that case, the value of $c_{12}=0$ and a=0. This means that the predictor "a" can never converge exactly to $c_{12}$ and will always converge to a value having a magnitude that is less than $c_{12}$. The modified channel 3 then has a residual value of $(c_{12}-a)$ at symbol twelve. The magnitude of the residual value determines whether or not Blind Equalization will converge to fifteen levels. The residual value $(c_{12}-a)$ at symbol twelve is equal to $c_{12}-[c_{12}/\Phi_{cc}(0)]$, which is equal to $c_{12}[1-1/\Phi_{cc}(0)]$. This residual value is directly proportional to $c_{12}$, so for large values of $c_{12}$ the residual value will be high and the Blind Equalization algorithm will not converge. As the value of $c_{12}$ is reduced, the residual value will decrease and will at some value be small enough for the Blind Equalization algorithm to converge.

Further, since $\Phi_{cc}(0)$ is a measure of the total channel energy, an increase in total channel energy will cause the residual value at symbol twelve to increase. This means that if a channel has several ghost signals, the residual value will be relatively larger. Thus, in order to have the small residual value necessary to achieve convergence, the value of $c_{12}$ will necessarily need to be relatively smaller. In other words, as the ghost energy increases, the maximum allowable amplitude at symbol twelve decreases, as shown in Table 3 for channels A, B, C and D. This is not the case for channel E because there is more than one contributor to $\Phi_{cc}(12)$, due to the correlation between $c_0$, $c_{12}$ and $c_{12}$, $c_{24}$. In summary, with no NTSC component and only one contributor to $\Phi_{cc}(12)$, the predictor "a" will converge to a value that is less than the magnitude of $c_{12}$. As $c_{12}$ decreases, the residual value at symbol twelve in the modified channel 3 also decreases, making the convergence to fifteen levels possible at some point. Finally, as the ghost energy increases, the maximum allowable value of $c_{12}$ decreases.

TABLE 3

| | | | NTSC Amplitude = 0.0 | | | |
|---|---|---|---|---|---|---|
| | Ghost Profile | | Maximum Positive Amplitude (dB) at channel tap = 12 | | Maximum Negative Amplitude (dB) at channel tap = 12 | |
| Channel | Delay (symbols) | Amplitude (absolute) | dfetap (12) zero in Blind | Predictor Before Comb | dfetap (12) zero in Blind | Predictor Before Comb |
| A | 0 | 1.0 | | | | |
| | 12 | | −18 | −6 | −18 | −7 |
| B | 0 | 1.0 | | | | |
| | 5 | 0.5 | | | | |
| | 12 | | −18 | −9 | −20 | −9 |
| C | 0 | 1.0 | | | | |
| | 5 | 0.5 | | | | |
| | 12 | | −20 | −11 | −20 | −11 |
| | 20 | 0.3 | | | | |
| D | 0 | 1.0 | | | | |
| | 5 | 0.5 | | | | |
| | 12 | | −21 | −12 | −20 | −12 |
| | 15 | 0.3 | | | | |
| | 20 | 0.3 | | | | |
| E | 0 | 1.0 | | | | |
| | 5 | 0.5 | | | | |
| | 12 | | −23 | −10 | −24 | −11 |
| | 15 | 0.3 | | | | |
| | 20 | 0.3 | | | | |
| | 24 | 0.3 | | | | |

The second example addresses the case of multiple contributions to the value of $\Phi_{cc}(12)$ in the absence of an NTSC signal 7. In this case the prediction coefficient is:

$$a = \phi_{cc}(12)/\phi_{cc}(0)$$
$$= [c_{12} + \text{contributions from other terms}]/\phi_{cc}(0)$$
$$= [c_{12}/\phi_{cc}(0)] + [\text{contributions from other terms}/\phi_{cc}(0)],$$

and the residual value becomes $$c_{12}[1-1/\Phi_{cc}(0)] + [\text{contributions from other terms}/\Phi_{cc}(0)].$$

In this case, the factor due to contributions from other terms may move the predictor coefficient towards or away from $c_{12}$ depending on whether the contributions have the same or opposite sign as $c_{12}$, as well as the magnitude of the contributions. Therefore, the likelihood of convergence becomes unpredictable. The equalizer 34 may or may not converge depending on how closely the prediction coefficient approximates the value of $c_{12}$.

A third example assumes the presence of an NTSC component and that the contribution to $\Phi_{cc}(12)$ is from the main channel and $c_{12}$ only. As discussed earlier, the optimum predictor coefficient is defined as:

$$a = [\Phi_{cc}(12)/\Phi_{cc}(0)]F$$

where $F = [1+\{\beta/\sigma_x^2 \Phi_{cc}(12)\}]/[1+\{\beta/\sigma_x^2 \Phi_{cc}(0)\}]$.

Given the presence of an NTSC component and that the contribution to $\Phi_{cc}(12)$ is from the main channel and $c_{12}$ only, the value of $\Phi_{cc}(12) = c_{12}$. If the amplitude at channel symbol twelve is positive, then $$\sigma_x^2 \Phi_{cc}(12) < \sigma_x^2 \Phi_{cc}(0),$$

$$\beta/\sigma_x^2 \Phi_{cc}(12) > \beta/\sigma_x^2 \Phi_{cc}(0),$$

$$1 + \beta/\sigma_x^2 \Phi_{cc}(12) < 1 + \beta/\sigma_x^2 \Phi_{cc}(0),$$

or, stated differently, F<1.

Therefore, with a negative amplitude at channel symbol twelve, $c_{12}$, the effect of the NTSC component 7 is to increase the value of the prediction coefficient "a", keeping in mind that the value of the prediction coefficient is negative because $c_{12}$ is negative. In other words, the magnitude of the prediction coefficient decreases since it is becoming more positive. Since the prediction coefficient is decreased in magnitude, the value of the prediction coefficient moves farther away from the value of $c_{12}$ and the residual value at symbol twelve is increased. Similarly, with the NTSC component present, the maximum allowable value at symbol twelve decreases relative to the maximum permissible value in the absence of the NTSC tone.

In summary, the presence of the NTSC tone 7 affects the value of the predictor coefficient "a". When $C_{12}$ is positive, the NTSC component 7 increases the allowable range of $c_{12}$, while the absence of the NTSC component 7 decreases allowable range of $c_{12}$. When the NTSC tone 7 is absent, an increase in the allowable magnitude of a positive $c_{12}$ and a decrease in the allowable magnitude of a negative $c_{12}$ results in an asymmetry in the permissible values of $c_{12}$.

A fourth case assumes the presence of an NTSC component 7 and that the contribution to $\Phi_{cc}(12)$ is from several sources. In this case, the optimum predictor coefficient is defined as $$a = [(c_{12} + \text{contributions from other terms})/\Phi_{cc}(0)]F.$$

Again, the contribution from other terms will cause an error in the predictor coefficient. Thus, in this case, the likelihood of convergence is unpredictable.

While Table 3 illustrates the performance of the first embodiment of the present invention in the absence of the NTSC component, Table 4 depicts the case where the NTSC amplitude is 0.10, and Table 5 addresses the case where the NTSC amplitude is 0.15. NTSC tone amplitudes values of 0.10 and 0.15 result in NTSC to VSB power ratios of approximately −13 dB and −10 dB, respectively. The simulation parameters are shown in Table 2. The value of dfe(12)

is set at zero in the Blind Equalization mode and is allowed to adapt in the Decision Directed Mode. The maximum positive and negative value of $c_{12}$ presented in the Table 3, Table 4 and Table 5 is determined by decreasing the amplitude of $c_{12}$ in one decibel steps until convergence is achieved. The values presented are for both positive and negative values of $c_{12}$ for every channel. The predictor coefficient "a" is updated for every symbol from the start of the Blind Equalization process using the LMS algorithm. Referring to FIG. 4, $e(n)=y(n)-ay(n-12)$, $a(n+1)=a(n)+alphap*e(n)*y(n-12)$, where a(n)=old predictor coefficient, a(n+1)=updated predictor coefficient, alphap=predictor step size, and y(n)=channel output, including the NTSC component.

Figure 6:
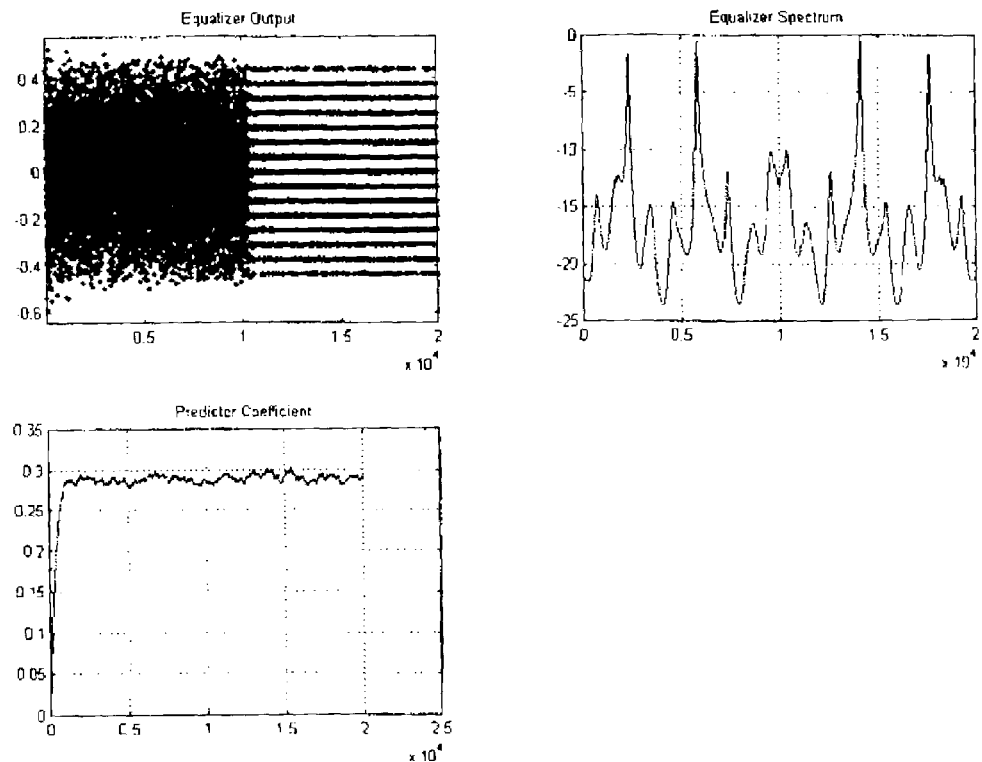
FIG. 6 is a series of convergence curves depicting the behavior of the equalizer for the case presented in FIG. 5.

Convergence curves for Channel D with an NTSC amplitude of 0.15 are shown in FIGS. 5 and 6. The complete results are shown in Table 3, Table 4 and Table 5. The tables also show, for comparison purposes, the results of setting dfe(12) to zero in a Blind Equalization mode without the use of any predictor.

TABLE 4

| | | | NTSC Amplitude = 0.10 | | | |
| | | | Maximum Positive Amplitude (dB) at channel tap = 12 | | Maximum Negative Amplitude (dB) at channel tap = 12 | |
| | Ghost Profile | | | | | |
| Channel | Delay (symbols) | Amplitude (absolute) | dfetap (12) zero in Blind | Predictor Before Comb | dfetap (12) zero in Blind | Predictor Before Comb |
|---|---|---|---|---|---|---|
| A | 0 | 1.0 | | | | |
| | 12 | | −18 | −5 | −19 | −9 |
| B | 0 | 1.0 | | | | |
| | 5 | 0.5 | | | | |
| | 12 | | −19 | −8 | −20 | −12 |
| C | 0 | 1.0 | | | | |
| | 5 | 0.5 | | | | |
| | 12 | | −21 | −10 | −20 | −15 |
| | 20 | 0.3 | | | | |
| D | 0 | 1.0 | | | | |
| | 5 | 0.5 | | | | |
| | 12 | | −21 | −10 | −20 | −15 |
| | 15 | 0.3 | | | | |
| | 20 | 0.3 | | | | |
| E | 0 | 1.0 | | | | |
| | 5 | 0.5 | | | | |
| | 12 | | −23 | −8 | −22 | −17 |
| | 15 | 0.3 | | | | |
| | 20 | 0.3 | | | | |
| | 24 | 0.3 | | | | |

TABLE 5

| | | | NTSC Amplitude = 0.15 | | | |
| | | | Maximum Positive Amplitude (dB) at channel tap = 12 | | Maximum Negative Amplitude (dB) at channel tap = 12 | |
| | Ghost Profile | | | | | |
| Channel | Delay (symbols) | Amplitude (absolute) | dfetap (12) zero in Blind | Predictor Before Comb | dfetap (12) zero in Blind | Predictor Before Comb |
|---|---|---|---|---|---|---|
| A | 0 | 1.0 | | | | |
| | 12 | | −18 | −5 | −18 | −23 |
| B | 0 | 1.0 | | | | |
| | 5 | 0.5 | | | | |
| | 12 | | −19 | −7 | −19 | −25 |
| C | 0 | 1.0 | | | | |
| | 5 | 0.5 | | | | |
| | 12 | | −21 | −9 | −20 | −28 |
| | 20 | 0.3 | | | | |
| D | 0 | 1.0 | | | | |
| | 5 | 0.5 | | | | |
| | 12 | | −20 | −9 | −20 | −27 |
| | 15 | 0.3 | | | | |
| | 20 | 0.3 | | | | |
| E | 0 | 1.0 | | | | |
| | 5 | 0.5 | | | | |

TABLE 5-continued

| | | | NTSC Amplitude = 0.15 | | | |
|---|---|---|---|---|---|---|
| | Ghost Profile | | Maximum Positive Amplitude (dB) at channel tap = 12 | | Maximum Negative Amplitude (dB) at channel tap = 12 | |
| Channel | Delay (symbols) | Amplitude (absolute) | dfetap (12) zero in Blind | Predictor Before Comb | dfetap (12) zero in Blind | Predictor Before Comb |
| | 12 | | −23 | −7 | −23 | −44 |
| | 15 | 0.3 | | | | |
| | 20 | 0.3 | | | | |
| | 24 | 0.3 | | | | |

The first embodiment of the present invention just described, in which the predictor 1 is placed before the comb filter 2, fails to produce a fifteen level output in the presence of a preghost+postghost composite signal that supplies energy to dfe(12), even if the value of $c_{12}$ is zero. Further, when there are more than two contributors to $\Phi_{cc}(12)$, the convergence becomes unpredictable. This case occurs when there are two ghost signals spaced twelve symbols apart, other than the ghost at symbol twelve. Finally, a fifteen level output will not be produced if the amplitude of $c_{12}$ is outside of the allowable range for the particular channel.

An examination of Table 3, Table 4 and Table 5 shows that the presence of an NTSC component causes the allowable range of $c_{12}$ to be asymmetric. The allowable range of $c_{12}$ is larger with the use of a predictor for lower NTSC tone levels (0.0 and 0.10). For an NTSC level of 0.15, the range of allowable positive $c_{12}$ values is greater than possible without the use of a predictor, but the allowable range of negative $c_{12}$ values is decreased, due to the effect of the NTSC tone on the predictor coefficient. The plots of the DFE taps shown in FIGS. 5 and 6 show that the length of the modified channel 3 increases by twelve symbols over the original channel 4, and that more ghosts of a smaller amplitude are introduced because of the predictor. Finally, the NTSC tone 7 is seen to be an advantage to the predictor coefficient if the value of $c_{12}$ is positive, but is a disadvantage if the value is negative. This characteristic points to the need to cause the predictor coefficient to be independent of the NTSC tone, as will now be discussed.

Figure 7:
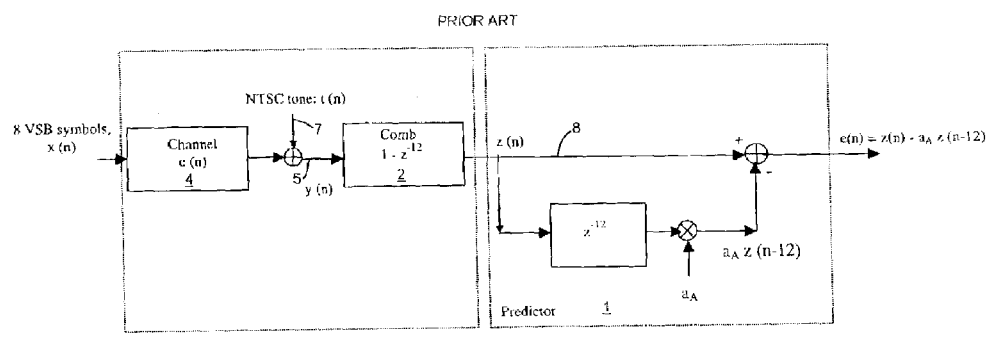
FIG. 7 is a simplified block diagram of a prior art arrangement in which a predictor filter is placed after a comb filter.

In the second embodiment of the present invention, the predictor coefficient "a" is made independent of the NTSC signal by placing the predictor 1 after the comb filter 2. The prior art version of such an arrangement is depicted in FIG. 7. In this arrangement, the comb filter 2 attenuates the NTSC tone 7 and the predictor 1 perceives a signal 8 that is free of the NTSC component. The channel that the predictor 1 receives is the original channel 4 convolved with the comb filter 2. The predictor transfer function is $$Hcp(z) = (1 + c_{12}z^{-12} + \ldots)(1 - z^{-12})$$
$$= 1 + (c_{12} - 1)z^{-12} + \ldots$$

The predictor 1 perceives a value of $(c_{12}-1)$ at symbol twelve and will converge to a value that is related to $(c_{12}-1)$, which is not desired. The goal is to perceive the channel as having only $c_{12}$ at symbol twelve. As discussed for the first embodiment of the present invention, the predictor 1 will converge to $$a_A = \Phi_{zz}(12)/\Phi_{zz}(0),$$

where $a_A$=the value to which the predictor 1 will converge if the predictor 1 is placed before the comb filter 2. However, the goal is to have the comb filter 2 hidden from the predictor 1. Ideally, the predictor 1 will converge to a value of $a_B = \Phi_{yy}(12)/\Phi_{yy}(0)$ with an NTSC signal 7 of zero, where $a_B$ is the value to which the predictor 1 will converge if placed before the comb filter 2 and in the absence of any NTSC signal 7. In other words, the predictor 1 should converge to the same value that would occur if the predictor 1 were placed before the comb filter 2 without any NTSC component 7.

Thus the relationship between the equations $a_A = \Phi_{zz}(12)/\Phi_{zz}(0)$ and $a_B = \Phi_{yy}(12)/\Phi_{yy}(0)$ needs to be derived, which is done as follows:

$$\phi_{zz}(m) = E[z(n)z(n-m)]$$
$$= E[\{y(n) - y(n-12)\}\{y(n-m) - y(n-m-12)\}]$$
$$= \phi_{yy}(m) - \phi_{yy}(m+12) - \phi_{yy}(m-12) + \phi_{yy}(m)$$
$$= 2\phi_{yy}(m) - \phi_{yy}(m+12) - \phi_{yy}(m-12).$$

So $\Phi_{zz}(0) = 2\Phi_{yy}(0) - 2\Phi_{yy}(12)$ (autocorrelation is an even function), and $\Phi_{zz}(12) = 2\Phi_{yy}(12) - \Phi_{yy}(24) - \Phi_{yy}(0)$.

Therefore, the value $a_A$, is $$a_A = [2\Phi_{yy}(12) - \Phi_{yy}(0) - \Phi_{yy}(24)]/[2\Phi_{yy}(0) - 2\Phi_{yy}(12)].$$

If the value of $\Phi_{yy}(24)$ is assumed to be zero, and knowing that $a_B = \Phi_{yy}(12)/\Phi_{yy}(0)$, then $$a_A = [2\phi_{yy}(12) - \phi_{yy}(0)]/[2\phi_{yy}(0) - 2\phi_{yy}(12)]$$
$$= [2a_B - 1]/[2 - 2a_B].$$

Solving for $a_B$ produces the following relationship between $a_A$ and $a_B$:

$$a_B = [2a_A + 1]/[2a_A + 2].$$

Figure 8:
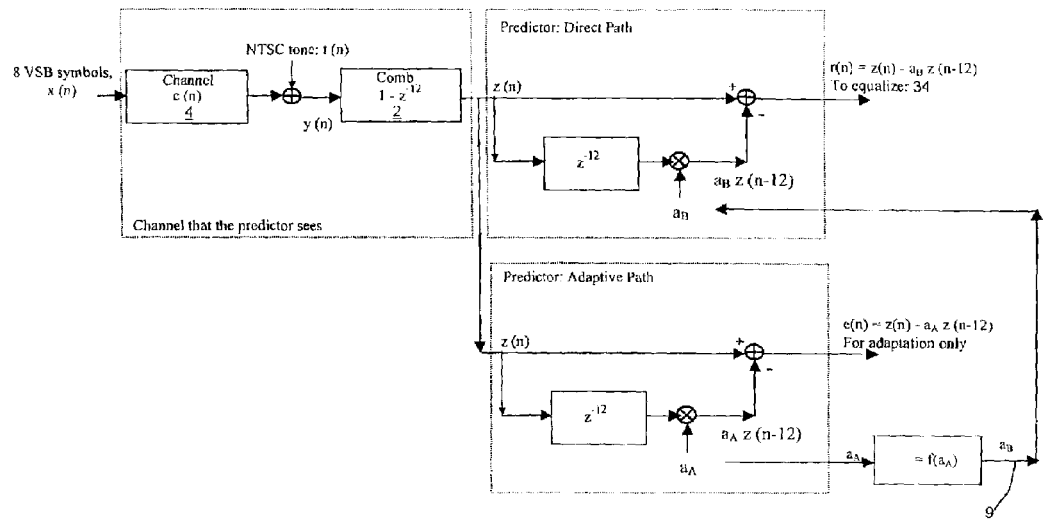
FIG. 8 is a simplified block diagram of a second embodiment of the present invention.

Referring also to FIG. 8, the second embodiment of the present invention shows that the predictor 1 can be placed after the comb filter 2 and be permitted to adapt to give a value for $a_A$. The value of $a_B$ can then be calculated from $a_A$, and the value of $a_B$ can be used in the direct path 9 to the equalizer 34. The maximum positive and negative amplitudes for representative channels A, B, C, D and E are set forth in Table 6, Table 7 and Table 8. The values associated with these channels are the same as shown in Table 2, except that the amplitude of the NTSC tone 7 is 0.15 for all three Table 6, Table 7 and Table 8. The value of dfe(12) is set at zero in the Blind Equalization mode and is allowed to adapt in the Decision Directed mode. The maximum positive and negative value of $c_{12}$ for each channel is found by decreasing the amplitude of $c_{12}$ by increments of one decibel until convergence is achieved. Both of the predictor coefficients $a_A$ and $a_B$ are updated at every symbol. The value of $a_A$ is updated using the LMS algorithm, and then $a_B$ is calculated from the value of $a_A$ using the relationship earlier described. Referring to FIG. 8, the update equations used are as follows:

Initialize $a_A$ to −0.5 so that the initial value of $a_B$ is zero.

$$r(n)=z(n)-a_B z(n-12)$$

$$c(n)=z(n)-a_A z(n-12)$$

$$a_A(n+1)=a_A(n)+alphap*c(n)*z(n-12)$$

$$a_B(n+1)=[2a_A(n+1)+1]/[2a_A(n+1)+2].$$

Figure 9:
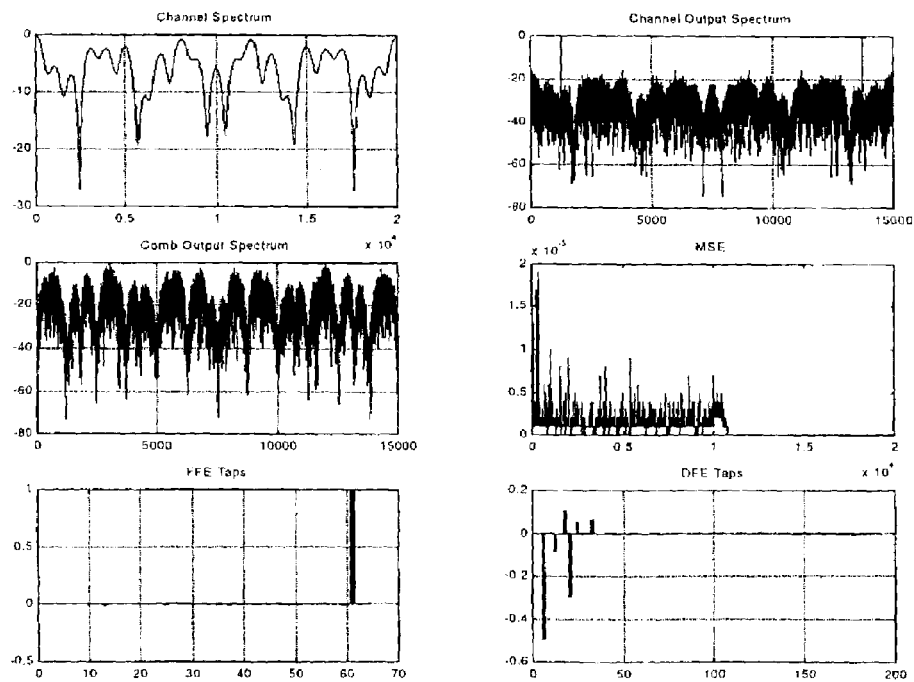
FIG. 9 is a series of convergence curves showing the characteristics of a channel processed by the second embodiment of the present invention.
Figure 10:
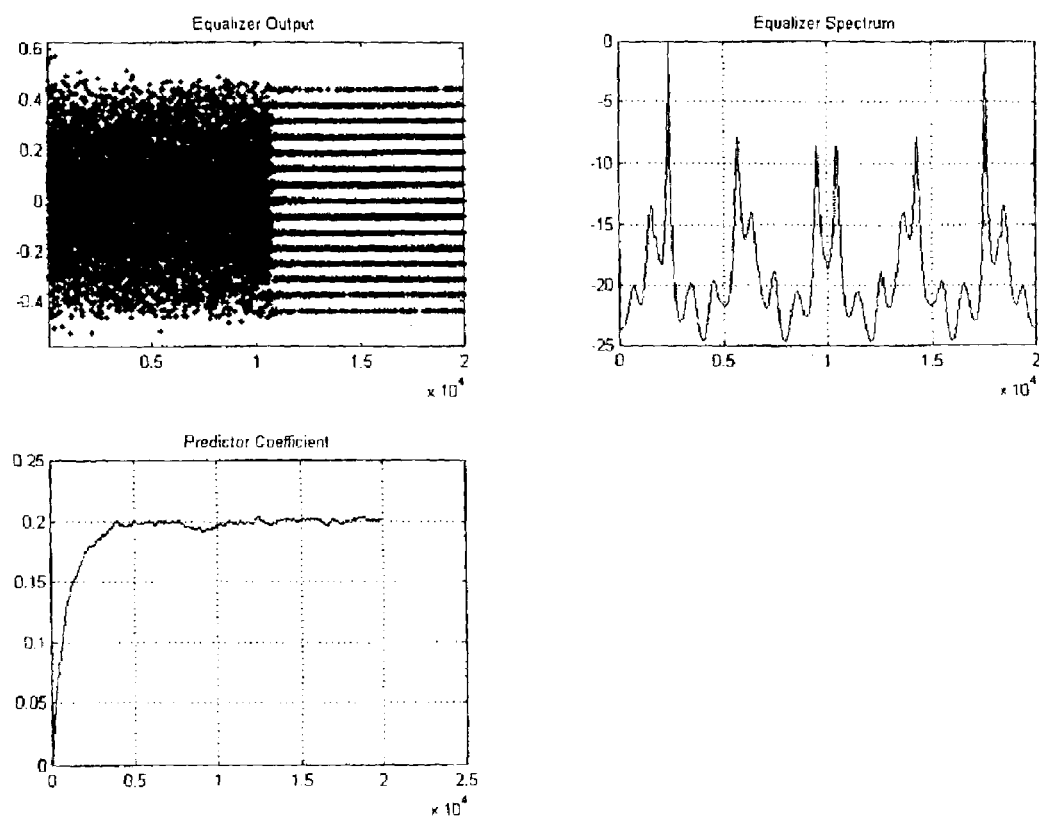
FIG. 10 is a series of convergence curves depicting the behavior of the equalizer for the case presented in FIG. 9.

The convergence curves for the case where the NTSC signal 7 amplitude is 0.15 are shown in FIGS. 9 and 10. The predictor coefficient plotted in FIGS. 9 and 10 is $a_B$. Results of the previous two methods are also included in the Table 6, Table 7 and Table 8 for comparison purposes. Note that for channel E, when the predictor 1 is placed after comb filter 2 convergence is not achieved because in deriving the relationship between $a_A$ and $a_B$ the assumption was made that $\Phi_{yy}(24)$ was equal to zero. This assumption is violated in the data presented since $\Phi_{yy}(24)$ is not zero because there is a ghost at symbol 24. When the value of NTSC signal 7 is effectively zero, $\Phi_{yy}(24)=\Phi_{cc}(24)$.

TABLE 6

| | | | NTSC Amplitude = 0.0 | | | | | |
|---|---|---|---|---|---|---|---|---|
| | | | Maximum Positive Amplitude (dB) at channel tap = 12 | | | Maximum Negative Amplitude (dB) at channel tap = 12 | | |
| | Ghost Profile | | | Predictor | Predictor | | Predictor | Predictor |
| Channel | Delay (symbols) | Amplitude (absolute) | dfetap (12) zero in Blind | Before Comb | After Comb | dfetap (12) zero in Blind | Before Comb | After Comb |
| A | 0 | 1.0 | | | | | | |
| | 12 | | −18 | −6 | −6 | −18 | −7 | −7 |
| B | 0 | 1.0 | | | | | | |
| | 5 | 0.5 | | | | | | |
| | 12 | | −18 | −9 | −9 | −20 | −9 | −9 |
| C | 0 | 1.0 | | | | | | |
| | 5 | 0.5 | | | | | | |
| | 12 | | −20 | −11 | −11 | −20 | −11 | −11 |
| | 20 | 0.3 | | | | | | |
| D | 0 | 1.0 | | | | | | |
| | 5 | 0.5 | | | | | | |
| | 12 | | −21 | −12 | −12 | −20 | −12 | −11 |
| | 15 | 0.3 | | | | | | |
| | 20 | 0.3 | | | | | | |
| E | 0 | 1.0 | | | | | | |
| | 5 | 0.5 | | | | | | |
| | 12 | | −23 | −10 | Did not converge | −24 | −11 | Did not converge |
| | 15 | 0.3 | | | | | | |
| | 20 | 0.3 | | | | | | |
| | 24 | 0.3 | | | | | | |

TABLE 7

| | | | NTSC Amplitude = 0.10 | | | | | |
|---|---|---|---|---|---|---|---|---|
| | | | Maximum Positive Amplitude (dB) at channel tap = 12 | | | Maximum Negative Amplitude (dB) at channel tap = 12 | | |
| | Ghost Profile | | | Predictor | Predictor | | Predictor | Predictor |
| Channel | Delay (symbols) | Amplitude (absolute) | dfetap (12) zero in Blind | Before Comb | After Comb | dfetap (12) zero in Blind | Before Comb | After Comb |
| A | 0 | 1.0 | | | | | | |
| | 12 | | −18 | −5 | −6 | −19 | −9 | −7 |
| B | 0 | 1.0 | | | | | | |
| | 5 | 0.5 | | | | | | |
| | 12 | | −19 | −8 | −9 | −20 | −12 | −9 |
| C | 0 | 1.0 | | | | | | |
| | 5 | 0.5 | | | | | | |
| | 12 | | −21 | −10 | −11 | −20 | −15 | −11 |
| | 20 | 0.3 | | | | | | |

TABLE 7-continued

| | | | NTSC Amplitude = 0.10 | | | | | |
|---|---|---|---|---|---|---|---|---|
| | | | Maximum Positive Amplitude (dB) at channel tap = 12 | | | Maximum Negative Amplitude (dB) at channel tap = 12 | | |
| | Ghost Profile | | | Predictor | Predictor | | Predictor | Predictor |
| Channel | Delay (symbols) | Amplitude (absolute) | dfetap (12) zero in Blind | Before Comb | After Comb | dfetap (12) zero in Blind | Before Comb | After Comb |
| D | 0 | 1.0 | | | | | | |
| | 5 | 0.5 | | | | | | |
| | 12 | | −21 | −10 | −12 | −20 | −15 | −11 |
| | 15 | 0.3 | | | | | | |
| | 20 | 0.3 | | | | | | |
| E | 0 | 1.0 | | | | | | |
| | 5 | 0.5 | | | | | | |
| | 12 | | −23 | −8 | Did not converge | −22 | −17 | Did not converge |
| | 15 | 0.3 | | | | | | |
| | 20 | 0.3 | | | | | | |
| | 24 | 0.3 | | | | | | |

TABLE 8

| | | | NTSC Amplitude = 0.15 | | | | | |
|---|---|---|---|---|---|---|---|---|
| | | | Maximum Positive Amplitude (dB) at channel tap = 12 | | | Maximum Negative Amplitude (dB) at channel tap = 12 | | |
| | Ghost Profile | | | Predictor | Predictor | | Predictor | Predictor |
| Channel | Delay (symbols) | Amplitude (absolute) | dfetap (12) zero in Blind | Before Comb | After Comb | dfetap (12) zero in Blind | Before Comb | After Comb |
| A | 0 | 1.0 | | | | | | |
| | 12 | | −18 | −5 | −6 | −18 | −23 | −7 |
| B | 0 | 1.0 | | | | | | |
| | 5 | 0.5 | | | | | | |
| | 12 | | −19 | −7 | −9 | −19 | −25 | −9 |
| C | 0 | 1.0 | | | | | | |
| | 5 | 0.5 | | | | | | |
| | 12 | | −21 | −9 | −11 | −20 | −28 | −11 |
| | 20 | 0.3 | | | | | | |
| D | 0 | 1.0 | | | | | | |
| | 5 | 0.5 | | | | | | |
| | 12 | | −20 | −9 | −12 | −20 | −27 | −11 |
| | 15 | 0.3 | | | | | | |
| | 20 | 0.3 | | | | | | |
| E | 0 | 1.0 | | | | | | |
| | 5 | 0.5 | | | | | | |
| | 12 | | −23 | −7 | Did not converge | −23 | −44 | Did not converge |
| | 15 | 0.3 | | | | | | |
| | 20 | 0.3 | | | | | | |
| | 24 | 0.3 | | | | | | |

As was discussed with regard to the first embodiment of the present invention, the predictor "a" will converge to a value that is less than the magnitude of $c_{12}$, resulting in a residual of $(a-c_{12})$ at symbol twelve in the modified channel 3.

A third embodiment of the present invention addresses the problem of estimating $c_{12}$ from the predictor coefficient "a" in order to make the residual value smaller. In the case of the first embodiment, the predictor was seen to converge to a value given by $a=\Phi_{cc}(12)/\Phi_{cc}(0)$. For the case where there is only one contribution to $\Phi_{cc}(12)$ from the main channel 4 and $c_{12}$, the predictor is $$a = \phi_{cc}(12)/\phi_{cc}(0)$$
$$= c_{12}/(1 + c_{12}^2 + E),$$

where E=energy from ghost signals other than the main channel and $c_{12}$.

If the value of E is zero, as occurs in the unusual case where there is a ghost signal only at symbol twelve, the equation for the predictor becomes a quadratic relationship between "a" and $c_{12}$. This relationship permits the calculation of an estimated value for $c_{12}$. When E has a nonzero value, the equation becomes $$ac_{12}^2 - c_{12} + a(1+E) = 0.$$

Solving for $c_{12}$ gives the result $$c_{12} = [1 - mt;epmrl;\sqrt{1 - 4italamedsup2reset}(beginbold1endboldital+Emed)rlxmx]/(2a)$$

Figure 11:
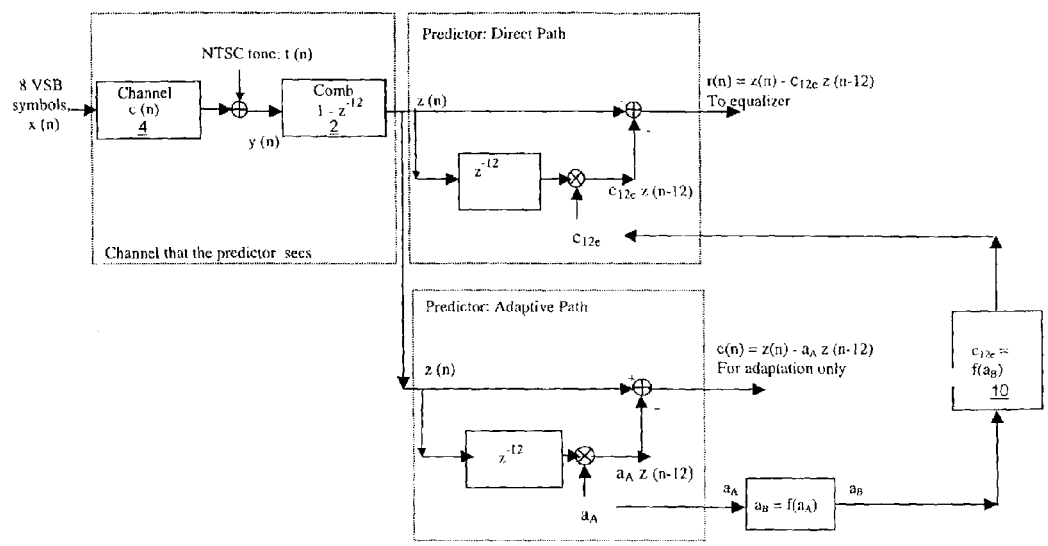
FIG. 11 is a simplified block diagram of a third embodiment of the present invention.

If E=0, as is the case for channel A, then $c_{12}$ can be solved exactly, once the prediction coefficient is known, and then $c_{12}$ can be used in the direct path to the equalizer 34. In most cases, the value of E will not be known and the value of $c_{12}$ cannot be determined. However, by assuming that E is small, the value of $c_{12}$ can be calculated from the predictor "a". By using this assumption, the allowable amplitude of $c_{12}$ can be increased. The resulting configuration is depicted in FIG. 11 in which an additional tap prediction block 10 appears for the calculation of estimated tap value $c_{12e}$.

The maximum positive and negative amplitudes for representative channels A, B, C, D and E are set forth in Table 9, Table 10 and Table 11. The values associated with these channels are the same as shown in Table 2. The value of dfe(12) is set at zero in the Blind Equalization mode and is allowed to adapt in the Decision Directed mode. The maximum positive and negative value of $c_{12}$ for each channel is found by decreasing the amplitude of $c_{12}$ by increments of one decibel until convergence is achieved. Both of the predictor coefficients $a_A$ and $a_B$, and the tap estimate $c_{12e}$ are updated at every symbol. Referring to FIG. 11, the update equations used are as follows:

Initialize $a_A$ to $-0.5$ so that the initial value of $a_B$ is zero.

$$r(n) = z(n) - c_{12e}z(n-12)$$

$$c(n) = z(n) - a_A z(n-12)$$

$$a_A(n+1) = a_A(n) + alphap*c(n)*z(n-12)$$

$$a_B(n+1) = [2a_A(n+1)+1]/[2a_A(n+1)+2]$$

$$c_{12e}(n+1) = [1 - mt;epmrl;\sqrt{1 - 4italamedinfbeginitalBenditalresetsup2reset(beginbold1+endbolditalEmed)rlxmx}]/(2a_B(n+1))$$

Figure 12:
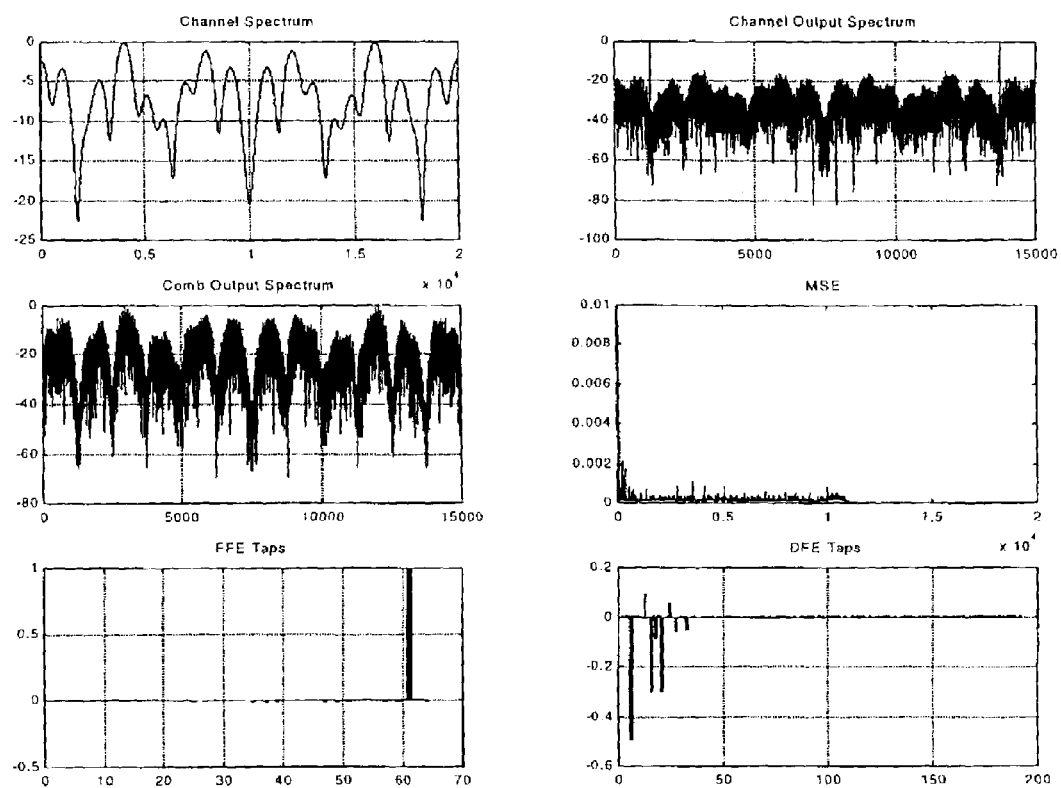
FIG. 12 is a series of convergence curves showing the characteristics of a channel processed by the third embodiment of the present invention.
Figure 13:
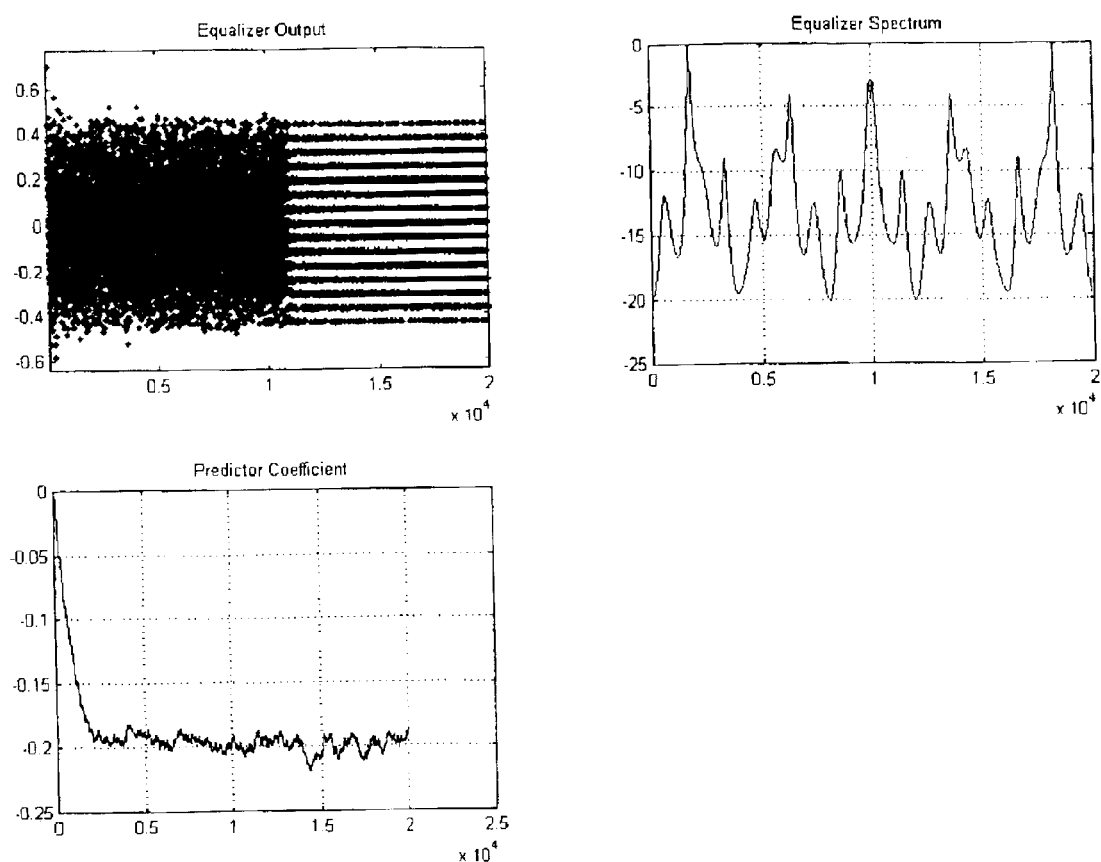
FIG. 13 is a series of convergence curves depicting the behavior of the equalizer for the case presented in FIG. 12.

In order to avoid a square root of a negative number, the absolute value of $a_B$ must be less than or equal to 0.5. In order to avoid division by zero, the value of $a_B$ must not be zero. Whenever the absolute value of $a_B$ is greater than 0.5 or is equal to zero, the value of $c_{12e}$ is not updated but is instead frozen at its most recent value. The convergence curves for three cases are shown in FIGS. 12 and 13. Results of the previous three methods are also included in Table 9, Table 10 and Table 11 for comparison purposes.

TABLE 9

| | | | | | | NTSC Amplitude = 0.0 | | | |
| | | | Maximum Positive Amplitude (dB) at channel tap = 12 | | | | Maximum Negative Amplitude (dB) at channel tap = 12 | | |
| | | | | | Predictor | | | Predictor | |
| | Ghost Profile | | dfetap (12) | Predictor | | After Comb | dfetap (12) | Predictor | | After Comb |
| Channel | Delay (symbols) | Amplitude (absolute) | zero in Blind | Before Comb | After Comb | with tap estimate | zero in Blind | Before Comb | After Comb | with tap estimate |
| A | 0 | 1.0 | | | | | | | | |
|   | 12 |     | −18 | −6 | −6 | −1 | −18 | −7 | −7 | −1 |
| B | 0 | 1.0 | | | | | | | | |
|   | 5 | 0.5 | | | | | | | | |
|   | 12 |     | −18 | −9 | −9 | −8 | −20 | −9 | −9 | −9 |
| C | 0 | 1.0 | | | | | | | | |
|   | 5 | 0.5 | | | | | | | | |
|   | 12 |     | −20 | −11 | −11 | −11 | −20 | −11 | −11 | −11 |
|   | 20 | 0.3 | | | | | | | | |
| D | 0 | 1.0 | | | | | | | | |
|   | 5 | 0.5 | | | | | | | | |
|   | 12 |     | −21 | −12 | −12 | −11 | −20 | −12 | −11 | −11 |
|   | 15 | 0.3 | | | | | | | | |
|   | 20 | 0.3 | | | | | | | | |
| E | 0 | 1.0 | | | | | | | | |
|   | 5 | 0.5 | | | | | | | | |

TABLE 9-continued

| | | | NTSC Amplitude = 0.0 | | | | | | |
|---|---|---|---|---|---|---|---|---|---|
| | | | Maximum Positive Amplitude (dB) at channel tap = 12 | | | | Maximum Negative Amplitude (dB) at channel tap = 12 | | |
| | | | | | Predictor | | | Predictor | |
| | Ghost Profile | | dfetap (12) | | | After Comb | dfetap (12) | | After Comb |
| Channel | Delay (symbols) | Amplitude (absolute) | zero in Blind | Before Comb | After Comb | with tap estimate | zero in Blind | Before Comb | After Comb | with tap estimate |
| | 12 | | −23 | −10 | Did not converge | | −24 | −11 | Did not converge | |
| | 15 | 0.3 | | | | | | | | |
| | 20 | 0.3 | | | | | | | | |
| | 24 | 0.3 | | | | | | | | |

TABLE 10

| | | | NTSC Amplitude = 0.10 | | | | | | |
|---|---|---|---|---|---|---|---|---|---|
| | | | Maximum Positive Amplitude (dB) at channel tap = 12 | | | | Maximum Negative Amplitude (dB) at channel tap = 12 | | |
| | | | | | Predictor | | | Predictor | |
| | Ghost Profile | | dfetap (12) | | | After Comb | dfetap (12) | | After Comb |
| Channel | Delay (symbols) | Amplitude (absolute) | zero in Blind | Before Comb | After Comb | with tap estimate | zero in Blind | Before Comb | After Comb | with tap estimate |
| A | 0 | 1.0 | | | | | | | | |
| | 12 | | −18 | −5 | −6 | −1 | −19 | −9 | −7 | −1 |
| B | 0 | 1.0 | | | | | | | | |
| | 5 | 0.5 | | | | | | | | |
| | 12 | | −19 | −8 | −9 | −8 | −20 | −12 | −9 | −9 |
| C | 0 | 1.0 | | | | | | | | |
| | 5 | 0.5 | | | | | | | | |
| | 12 | | −21 | −10 | −11 | −11 | −20 | −15 | −11 | −10 |
| | 20 | 0.3 | | | | | | | | |
| D | 0 | 1.0 | | | | | | | | |
| | 5 | 0.5 | | | | | | | | |
| | 12 | | −21 | −10 | −12 | −11 | −20 | −15 | −11 | −11 |
| | 15 | 0.3 | | | | | | | | |
| | 20 | 0.3 | | | | | | | | |
| E | 0 | 1.0 | | | | | | | | |
| | 5 | 0.5 | | | | | | | | |
| | 12 | | −23 | −8 | Did not converge | | −22 | −17 | Did not converge | |
| | 15 | 0.3 | | | | | | | | |
| | 20 | 0.3 | | | | | | | | |
| | 24 | 0.3 | | | | | | | | |

TABLE 11

| | | | NTSC Amplitude = 0.15 | | | | | | |
|---|---|---|---|---|---|---|---|---|---|
| | | | Maximum Positive Amplitude (dB) at channel tap = 12 | | | | Maximum Negative Amplitude (dB) at channel tap = 12 | | |
| | | | | | Predictor | | | Predictor | |
| | Ghost Profile | | dfetap (12) | | | After Comb | dfetap (12) | | After Comb |
| Channel | Delay (symbols) | Amplitude (absolute) | zero in Blind | Before Comb | After Comb | with tap estimate | zero in Blind | Before Comb | After Comb | with tap estimate |
| A | 0 | 1.0 | | | | | | | | |
| | 12 | | −18 | −5 | −6 | −1 | −18 | −23 | −7 | −1 |
| B | 0 | 1.0 | | | | | | | | |
| | 5 | 0.5 | | | | | | | | |
| | 12 | | −19 | −7 | −9 | −8 | −19 | −25 | −9 | −9 |
| C | 0 | 1.0 | | | | | | | | |
| | 5 | 0.5 | | | | | | | | |

TABLE 11-continued

| | | | Maximum Positive Amplitude (dB) at channel tap = 12 | | | | Maximum Negative Amplitude (dB) at channel tap = 12 | | | |
| | | | | | | Predictor | | | | |
| | Ghost Profile | | dfetap (12) | Predictor | | After Comb | dfetap (12) | Predictor | | After Comb |
| Channel | Delay (symbols) | Amplitude (absolute) | zero in Blind | Before Comb | After Comb | with tap estimate | zero in Blind | Before Comb | After Comb | with tap estimate |
|---|---|---|---|---|---|---|---|---|---|---|
| | 12 | | −21 | −9 | −11 | −11 | −20 | −28 | −11 | −10 |
| | 20 | 0.3 | | | | | | | | |
| D | 0 | 1.0 | | | | | | | | |
| | 5 | 0.5 | | | | | | | | |
| | 12 | | −20 | −9 | −12 | −12 | −20 | −27 | −11 | −11 |
| | 15 | 0.3 | | | | | | | | |
| | 20 | 0.3 | | | | | | | | |
| E | 0 | 1.0 | | | | | | | | |
| | 5 | 0.5 | | | | | | | | |
| | 12 | | −23 | −7 | Did not converge | | −24 | −44 | Did not converge | |
| | 15 | 0.3 | | | | | | | | |
| | 20 | 0.3 | | | | | | | | |
| | 24 | 0.3 | | | | | | | | |

Inspection of Table 9, Table 10 and Table 11 reveals that for channel A, where there is a ghost only at symbol 12, the tap estimate can be calculated exactly from the predictor coefficient since E=0. In this case, the residual can be made to be extremely small or, equivalently, $c_{12}$ can take on a very large value (−1 dB). In practice the probability of having channel A is very small. For channels B, C, D and E, the maximum allowable positive and negative amplitudes for $c_{12}$ are in most cases the same as the method presented in the second embodiment, but in a few instances, the maximum allowable amplitude is 1 dB more.

The use of the predictor 1 after the comb filter 2 along with the use of the tap estimate will fail to produce a fifteen level output at the equalizer 34 in several cases. One case is when a preghost+postghost composite signal is present that supplies energy to dfe(12), even if the value of $c_{12}$ is zero. Also, when there are more than two contributors to $\Phi_{cc}(12)$, the convergence becomes unpredictable. This case occurs when there are two ghost signals spaced twelve symbols apart, other than the ghost at symbol twelve. Another failed case occurs when there is a ghost at symbol 24 or there are two ghosts spaced 24 symbols apart. A fifteen level output will not be produced if the amplitude of $c_{12}$ is outside of the allowable range for the particular channel. Finally, whenever the absolute value of $a_B$ is greater than 0.5, the tap estimate $c_{12e}$ is frozen at its previous value, since the argument of the square root becomes negative. Therefore, a problem will occur whenever the absolute value of the predictor coefficient $a_B$ has to converge to a value of greater than 0.5.

Three specific embodiments have been presented for producing at fifteen level output at the equalizer 34. Of those three, the placement of the predictor 1 after the comb filter 2 is typically the best choice. The scope of the invention, however, is defined by the claims and is not limited to the specific embodiments disclosed.

The invention claimed is:

1. An equalizing and filtering system for processing video data encoded symbols, comprising:
an input signal, the input signal comprising multiple level vestigial sideband (VSB) symbols;
a prediction filter (1), the prediction filter being responsive to the input signal and an interfering signal, the prediction filter being adapted to minimize an amplitude associated with a selected symbol
a comb filter (2), the comb filter being responsive to an output signal generated by the prediction filter (1); and
an equalizer (34), the equalizer (34) producing a signal having relatively more levels than the multiple level VSB symbol input signal.

2. The equalizing and filtering system of claim 1, wherein the equalizer (34) is an adaptive equalizer comprising a plurality of taps, each tap being associated with a particular symbol.

3. The equalizing and filtering system of claim 2, wherein the prediction filter (1) calculates an optimum prediction coefficient selected to minimize a selected symbol amplitude.

4. The equalizing and filtering system of claim 3, wherein the optimum prediction coefficient is calculated according to the equation $$a=[\Phi^{cc}(12)/\Phi_{cc}(0)]F,$$

where a is the optimum prediction coefficient, $\Phi(12)$ represents an autocorrelation function of a channel containing encoded data symbols, $\Phi_{cc}(0)$ represents total channel energy for a channel containing encoded data symbols, and F is factor attributable to the interfering signal.

5. An equalizing and filtering system for processing video data encoded symbols, comprising:
an input signal source, the input signal comprising multiple level vestigial sideband (VSB) symbols and containing a desired signal and an interfering signal;
a comb filter (2), the comb filter being responsive to the input signal, the comb filter (2) generating an output signal having an attenuated interfering signal;
a prediction filter (1), the prediction filter being responsive to the output signal generated by the comb filter (2), the prediction filter being adapted to minimize an amplitude associated with a selected symbol; and an equalizer (34), the equalizer (34) producing a signal having relatively more levels than the multiple level VSB symbol input signal.

6. The equalizing and filtering system of claim 5, wherein the means (34) for providing an equalized output signal is an adaptive equalizer comprising a plurality of tap values corresponding to symbols present in the encoded data packets, the equalizing and filtering system further including means for estimating (10) a tap value utilized by the means (34) for providing an equalized output signal.

* * * * *